(12) United States Patent  (10) Patent No.: US 7,526,471 B2
Dettinger et al.  (45) Date of Patent: Apr. 28, 2009

(54) FIELD-TO-FIELD JOIN CONSTRAINTS

(75) Inventors: Richard D. Dettinger, Rochester, MN (US); Daniel P. Kolz, Rochester, MN (US); Richard J. Stevens, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 466 days.

(21) Appl. No.: 11/016,215

(22) Filed: Dec. 17, 2004

(65) Prior Publication Data

US 2006/0136470 A1    Jun. 22, 2006

(51) Int. Cl.
G06F 7/00 (2006.01)
G06F 17/30 (2006.01)

(52) U.S. Cl. .......................................... 707/3; 707/102
(58) Field of Classification Search ............... 707/1–10, 707/100–104.1, 200–206
See application file for complete search history.

(56) References Cited

U.S. PATENT DOCUMENTS

| 6,725,227 | B1 |  | 4/2004 | Li |  |
|---|---|---|---|---|---|
| 6,996,558 | B2 | * | 2/2006 | Dettinger et al. | 707/4 |
| 7,146,376 | B2 | * | 12/2006 | Dettinger et al. | 707/102 |
| 2003/0172056 | A1 | * | 9/2003 | Dettinger et al. | 707/3 |
| 2004/0088292 | A1 | * | 5/2004 | Dettinger et al. | 707/4 |
| 2004/0158567 | A1 | * | 8/2004 | Dettinger et al. | 707/100 |
| 2004/0254939 | A1 | * | 12/2004 | Dettinger et al. | 707/100 |
| 2005/0076015 | A1 | * | 4/2005 | Dettinger et al. | 707/3 |

OTHER PUBLICATIONS

Urban, S. D et al., Delta abstractions: A technique for managing database states in runtime debugging of active database rules, May-Jun. 2003, IEEE, vol. 597-612.*
Chang T. H et al., A universal relation data model with semantic abstractions, Feb. 1992, IEEE, vol. 4, 23-33.*
Dettinger et al., IBM U.S. Appl. No. 10/083,075, filed Feb. 26, 2002, "Application Portability and Extensibility Through Database Schema and Query Abstraction".
Dettinger et al., IBM U.S. Appl. No. 11/005,418, filed Dec. 6, 2004, "Abstract Query Plan".

* cited by examiner

*Primary Examiner*—Jean B Fleurantin
(74) *Attorney, Agent, or Firm*—Patterson & Sheridan, LLP

(57) ABSTRACT

Embodiments of the present invention generally provide methods systems and articles of manufacture for query processing and for constructing a database abstraction model over an underlying physical database. The database abstraction model allows users to compose an abstract query using a logical view of data, instead of using the view of the underlying database architecture. Embodiments of the invention constrain the results returned from processing an abstract query according to relationships that exist for a group of logical fields. First, a group of logical fields may be related because they are part of a logical set. Field-to-field join constraints specify the logical fields that form a set, and an instance indicator used to determine the particular instance of a set that an element of data belongs to, according to a discrimination rule. Second, logical fields may be related because they are part of a series, and an instance identifier may provide an ordering rule used to determine the order of data elements that form the series.

13 Claims, 9 Drawing Sheets

FIELD-TO-FIELD JOIN CONSTRAINTS

CROSS-REFERENCE TO RELATED APPLICATIONS

This application is related to a commonly assigned, U.S. patent application Ser. No. 10/083,075, filed Feb. 26, 2002, entitled "Application Portability and Extensibility through Database Schema and Query Abstraction" which is incorporated herein by reference in its entirety. This application is also related to commonly assigned, U.S. patent application Ser. No. 11/016,202 entitled "Well Organized Query Result Sets", filed herewith commonly assigned, U.S. patent application entitled "Abstract Query Plan", Ser. No. 11/005,418, filed Dec. 6, 2004 commonly assigned, U.S. patent application Ser. No. 11/016,203 entitled "Creating a Logical Table from Multiple Differently Formatted Physical Tables Having Different Access Methods", filed herewith and commonly assigned, U.S. patent application Ser. No. 11/016,201 entitled "Transformation of a Physical Query into an Abstract Query", filed herewith which are incorporated herein by reference in their entirety.

BACKGROUND OF THE INVENTION

1. Field of the Invention

The present invention relates to computer databases. More particularly, the present invention relates to techniques for creating a data abstraction model over of a set of individual databases that includes constraints on how logically related data sets are joined together and presented to a user.

2. Description of the Related Art

Databases are well known systems for information storage and retrieval. The most prevalent type of database used today is the relational database, a tabular database in which data is defined so that it can be reorganized and accessed in a number of different ways. A relational database management system (DBMS) uses relational techniques for storing and retrieving data.

A database schema describes the structure of a database. For example, a relational schema describes a set of tables, columns, and primary and foreign keys that define relationships between different tables. Applications are developed that query data according to the database schema. For example, relational databases are commonly accessed using a front-end query application that is configured to perform data access routines, including searching, sorting, and query composition routines. At the back-end, software programs control data storage and respond to requests (queries) sent by users interacting with the front-end.

One issue faced by data mining and database query applications, however, is their close relationship with a given database schema. This relationship makes it difficult to support an application as changes are made to the corresponding underlying database schema. Further, this tightly bound relationship inhibits the migration of a query application to alternative data representations.

Commonly assigned U.S. patent application Ser. No. 10/083,075 (the '075 application), filed Feb. 26, 2002, entitled "Improved Application Flexibility Through Database Schema and Query Abstraction," discloses a framework that provides an abstract view of a physical data storage mechanism. The framework of the '075 application provides a requesting entity (i.e., an end-user or front-end application) with an abstract representation of data stored in an underlying physical storage mechanism, such as a relational database. In this way, the requesting entity is decoupled from the underlying physical data when accessing the underlying DBMS. Abstract queries based on the framework can be constructed without regard for the makeup of the physical data. Further, changes to the physical data schema do not also require a corresponding change in the front-end query application; rather, the abstraction provided by the framework can be modified to reflect the changes. Commonly assigned, U.S. patent application entitled "Abstract Query Plan", Ser. No. 11/005,418, filed Dec. 6, 2004 discloses techniques for processing an abstract query that include generating an intermediate representation of an abstract query then used to generate a resolved query consistent with the underlying database.

Oftentimes, relationships exist between data elements that are not captured by the table structure of a relational database. For example, consider a set of tests that make up a test suite (e.g., a set of toxicity tests given to a patient brought to the emergency room). Although each test is independent of or distinct from the others, the multiple tests are related and collectively form a set. Another relationship not captured by a relational database may be independent events that together form a series. A series of events may be ordered based on the sequence of individual events included in the series. The events may be different, but may also be the same event type repeated multiple times. For example, many treatment regimens or research experiments may be conducted sequentially. In addition, researchers often wish to identify patterns present in data. For example, a researcher may wish to form a set: event "A," event "B," and event "C" to seek a correlation to outcome "X." Similarly, a series (e.g., event "A," then event "B," and the event "C") may be defined as a sequence of events used to identify a possible outcome.

Data from the tests may be stored in a single column of a test table with an additional column that indicates the test type. Table I, below, is an example of such a table. This tabular arrangement allows results from new tests to be added without requiring a structural change to the relational schema. To the average user, however, it is very surprising that test results are often not stored together as a result set in the database. Table II illustrates a tabular arrangement that users might expect in that Table II is consistent with the users' logical perspective of the physical data.

TABLE I

Example Table - Actual

| ID | Result | Type | Date | Test Run |
|---|---|---|---|---|
| 1 | 12 | Test 1 | 11/3/04 | 1 |
| 1 | 45 | Test 2 | 11/4/04 | 1 |
| 1 | 203 | Test 3 | 11/5/04 | 1 |
| 1 | 9 | Test 1 | 11/20/04 | 2 |
| 1 | 47 | Test 2 | 11/21/04 | 2 |
| 1 | 198 | Test 3 | 11/22/04 | 2 |

TABLE II

Example Table Expected

| ID | Name | Test 1 | Test 2 | Test 3 |
|---|---|---|---|---|
| 1 | Dave | 12 | 45 | 203 |
| 1 | Dave | 9 | 47 | 198 |

Arranging a relational table consistent with the users' logical view of these relationships (e.g., as in Table II) leads to inefficient or un-maintainable database design. A new table would need to be added for each new test or test regimens.

Presenting the tests as they are stored in Table I, however, makes it difficult for users to interpret data.

Accordingly, there remains a need to extend the capabilities of an abstract database to account for the logical relationships between logical fields that may not be reflected by the underlying physical database schema, including set-type relationships and series-type relationships.

SUMMARY OF THE INVENTION

The present invention generally provides methods systems and articles of manufacture for query processing and for constructing a data abstraction model over an underlying physical database. Further, embodiments of the invention extend the capabilities of an abstract database to account for the logical relationships between logical fields that may not be reflected by the underlying physical database.

One embodiment of the invention provides a method of creating a database abstraction model. The method generally comprises defining a database abstraction model, wherein the database abstraction model defines a plurality of logical fields for composing an abstract query, wherein each logical field specifies (i) a name for the logical field and (ii) at least an access method that maps the logical field to data in an underlying physical database, identifying a logical relationship for a group of logical fields, and defining, for the database abstraction model, a field-to-field join constraint based on the logical relationship. The field-to-field join constraint defines how a set of query results retrieved for the group of logical fields should be joined together for purposes of being output.

Another embodiment of the invention provides a method of processing an abstract query that includes a group of logical fields specified by a field-to-field join constraint. The method generally includes, receiving, from a requesting entity, the abstract query, wherein the abstract query is composed from a plurality of logical fields specified in a database abstraction model, and wherein each logical field defines at least an access method that maps the logical field to data in an underlying physical database, and generating, from the abstract query, a resolved query of the underlying physical database. The method generally further includes issuing the resolved query to the underlying physical database to retrieve a set of query results, grouping the query results according to the field-to-field join constraint, wherein the field-to-field join constraint specifies how query results retrieved for the group of logical fields should be joined together for purposes of being output, and returning the grouped query results to the requesting entity.

Another embodiment of the invention provides a method of processing an abstract query that includes a group of logical fields specified by a field-to-field join constraint. The method generally comprises receiving, from a requesting entity, the abstract query, wherein the abstract query is composed from a plurality of logical fields specified in a database abstraction model, and wherein each logical field defines at least an access method that maps the logical field to data in an underlying physical database, generating, from the abstract query, a resolved query of the underlying physical database. The method generally further includes modifying the resolved query according to the field-to-field join constraint, wherein the field-to-field join constraint defines how the set of query results retrieved for the group of logical fields should be joined together for purposes of being output, executing the resolved query to retrieve a set of grouped query results from the database, and returning the grouped query results to the requesting entity.

Another embodiment of the invention provides a computer-readable medium containing a plurality of instructions which, when executed on a computer system is configured to perform operations. The operations generally include providing an interface for composing an abstract query of a database abstraction model, wherein the database abstraction model defines a plurality of logical fields, wherein each logical field specifies (i) name for the logical field and (ii) at least an access method that maps the logical field to data in an underlying physical database, receiving, an abstract query composed from the plurality of logical fields, generating, from the abstract query, a resolved query of the underlying physical database, issuing the resolved query to the underlying physical database to retrieve a set of query results, and grouping the query results according to the field-to-field join constraint. The field-to-field join constraint specifies how query results retrieved for the group of logical fields should be joined together for purposes of being output, and finally returning the grouped query results to the requesting entity.

Another embodiment of the invention provides a system for accessing a database storage mechanism. The system generally includes a database, a database abstraction model, wherein the database abstraction model defines (i) a plurality of logical fields for composing an abstract query, wherein each logical field specifies (a) a name for the logical field and (b) at least an access method that maps the logical field to data in the database, and (ii) at least a field-to-field join constraint based on a relationship between a group of logical fields, wherein the field-to-field join constraint defines how a set of query results retrieved for the group of logical fields should be joined together for purposes of being output. The system generally further includes an interface for composing an abstract query that includes the group of logical fields; and a runtime component configured to generate, from the abstract query, a resolved query of the database used to retrieve a set of query results from the database, wherein the query results are organized according to the field-to-field join constraint.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

The appended drawings, however, illustrate typical embodiments of the invention and, therefore, should not be considered limiting of its scope, for the invention may admit to other equally effective embodiments.

DETAILED DESCRIPTION OF THE PREFERRED EMBODIMENTS

Figure 1:
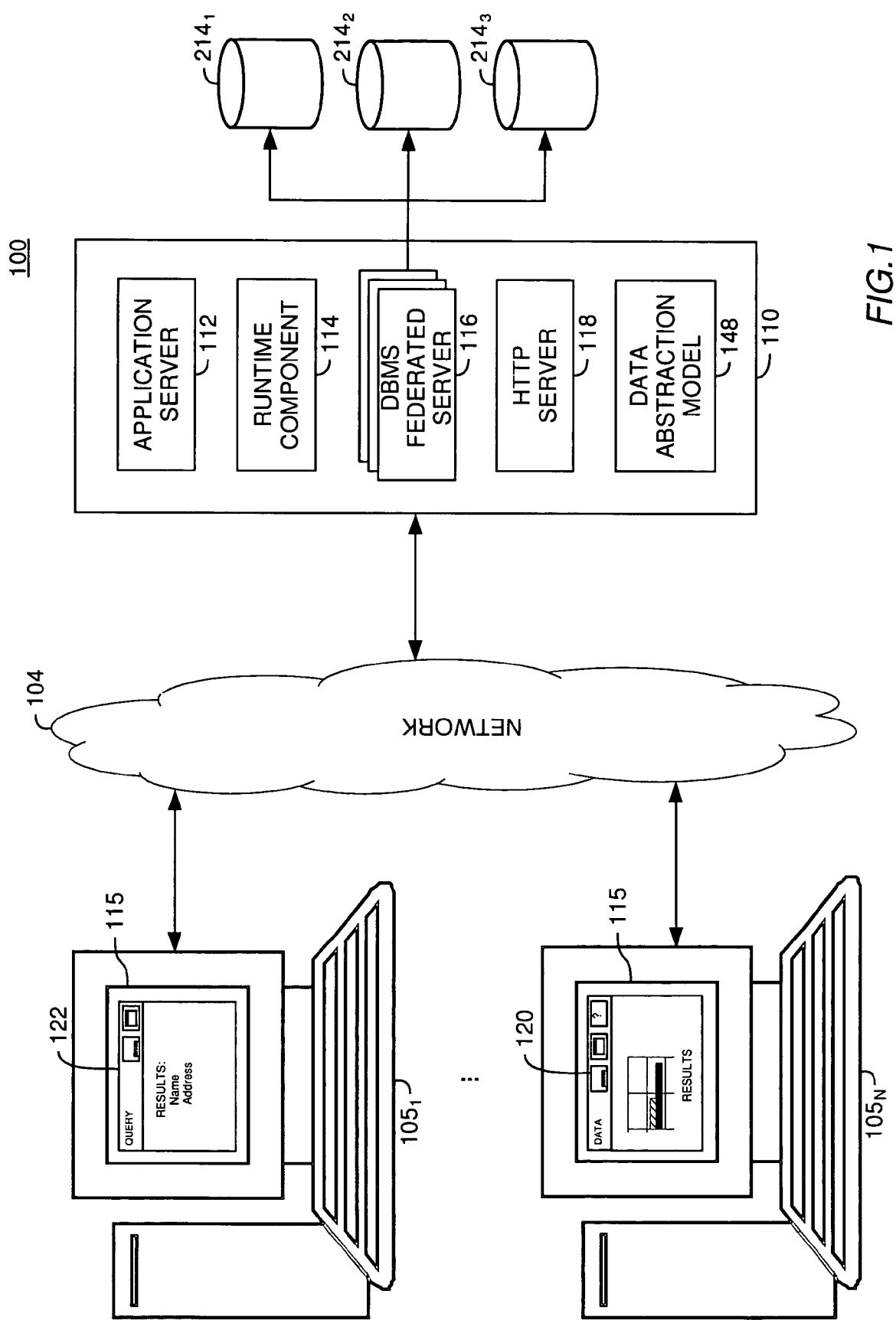
FIG. 1 illustrates a relational view of software and hardware components, according to one embodiment of the invention.

The present invention provides methods, systems, and articles of manufacture used to create a database abstraction model over a set of underlying physical data repositories. Embodiments of the invention specify related groups of logical fields provided by an abstract database to provide interesting query results according to relationships between groups of logical fields.

In one embodiment, a database abstraction model is constructed over a set of underlying database systems, such as a set of relational databases. The database abstraction model provides users with an interface to the relational databases that conform to a logical view of the data, instead of the view used by the underlying database system. Logical fields are defined by the database abstraction model that map to the underlying tables and columns of the database being abstracted. Additionally, relationships between logical fields may be defined by specifying that data corresponding to a group of logical fields may be grouped into instances of a set, or alternatively, may be ordered into a series. Query results are then returned as a group of sets, or as an ordered series. As used herein, a relationship between a group of logical fields that form a "set-type" or a "series-type" relationship are referred to herein as a "field-to-field join constraint" or "field-to-field relationship."

In one embodiment, data retrieved for a group of logical fields may be divided into instances of a set. A "set-type" field-to-field join constraint specifies the logical fields included in the set. An instance indicator may be used to determine which particular instance of a set that an element of data belongs to. In another embodiment, data retrieved for a group of logical fields that may be ordered into a series. In such an embodiment, an instance identifier is used to identify whether one instance of data falls before or after another instance in the series.

The following description references a common example used to illustrate the invention. The data used in these examples is provided only to facilitate the description the present invention and should in no way be construed as limiting thereof. Further, the following description references embodiments of the invention. The invention is not, however, limited to any specifically described embodiment. Rather, any combination of the following features and elements, whether related to a described embodiment or not, implements and practices the invention. Furthermore, in various embodiments the invention provides numerous advantages over the prior art. Although embodiments of the invention may achieve advantages over other possible solutions and the prior art, whether a particular advantage is achieved by a given embodiment does not limit the scope of the invention. Thus, the following aspects, features, embodiments and advantages are illustrative and are not considered elements or limitations of the appended claims except where explicitly recited in a claim. Likewise, references to "the invention" should neither be construed as a generalization of any inventive subject matter disclosed herein nor considered an element or limitation of the appended claims except where explicitly recited in a claim.

One embodiment of the invention is implemented as a program product for use with a computer system such as, for example, the computer system 100 shown in FIG. 1 and described below. The program product defines functions of the embodiments (including the methods) described herein and can be contained on a variety of signal-bearing media. Illustrative signal-bearing media include, without limitation, (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed across communications media, (e.g., a computer or telephone network) including wireless communications. The latter embodiment specifically includes information shared over the Internet or other computer networks. Such signal-bearing media, when carrying computer-readable instructions that perform methods of the invention, represent embodiments of the present invention.

In general, software routines implementing embodiments of the invention may be part of an operating system or part of a specific application, component, program, module, object, or sequence of instructions such as an executable script. Such software routines typically comprise a plurality of instructions capable of being performed using a computer system. Also, programs typically include variables and data structures that reside in memory or on storage devices as part of their operation. In addition, various programs described herein may be identified based upon the application for which they are implemented. Those skilled in the art recognize, however, that any particular nomenclature or specific application that follows facilitates a description of the invention and does not limit the invention for use solely with a specific application or nomenclature. Furthermore, the functionality of programs described herein using discrete modules or components interacting with one another. Those skilled in the art recognize, however, that different embodiments may combine or merge such components and modules in many different ways.

Database Abstraction Model: Physical Environment

FIG. 1 illustrates a networked computer system in a client-server configuration. Client computer systems $105_{1-N}$ include a network interface allowing network communication with other systems over network 104. The network 104 may comprise a local area network wherein both the client system 105 and server system 110 reside in the same general location, or may comprise network connections between geographically distributed systems, including network connections over the Internet. Client system 105 generally includes a central processing unit (CPU) connected via a bus, to memory and storage (not shown). Client system 105 is running an operating system, (e.g., a Linux® distribution, Microsoft Windows®, IBM's AIX® and OS/400® FreeBSD, and the like) that manages communication between hardware components and higher-level software applications running on client system 105.

In one embodiment, a user establishes a network connection between client system 105 and server system 110. Such a connection may include a login process wherein a user authenticates the user's identity to the server system 110 using, for example, a username and password or other authentication schemes (e.g., digital certificates or biometric authentication). Systems that do not require authentication, however, are also contemplated. The server system 110 may include computer hardware components similar to those used by client system 105. Accordingly, the server system 110 generally includes a CPU, a memory, and a storage device connected to a bus (not shown). The server system 110 is also running an operating system, (e.g., a Linux® distribution, Microsoft Windows®, IBM's AIX® or OS/400®, FreeBSD, and the like) that manages the interaction between hardware components and software applications.

The computer systems illustrated in FIG. 1, however, are merely exemplary of one hardware/software configuration. Embodiments of the present invention may be implemented using other configurations, regardless of whether the computer systems are complex, multi-user computing systems, such as a cluster of individual computers connected by a high-speed network, single-user workstations, network computers lacking non-volatile storage, personal digital assistants, and other specialized devices. Additionally, although described herein using a client/server network configuration, embodiments employing distributed computing, grid computing, or peer-to-peer processing techniques are contemplated.

In one embodiment, users interact with the server system 110 using a graphical user interface (GUI). In a particular embodiment, GUI content may comprise HTML documents (i.e., web-pages) rendered on a client computer system 1051 using web-browser 122. In such an embodiment, the server system 110 includes a Hypertext Transfer Protocol (http) server 118 (e.g., a web server such as the open source Apache web-sever program or IBM's Web Sphere® program) configured to respond to HTTP requests from the client system 105 and to transmit HTML data to client system 105. The web-pages themselves may be static documents stored on server system 110 or generated dynamically using application server 112 interacting with web-server 118. The web-pages may include pages that present a query-building interface 115.

Alternatively, or in addition, client application 120 may provide a database front-end, or query application program running on client system 105N. In either case, the query building interface 115 allows users to compose an abstract query. The resulting query is generally referred to herein as an "abstract query" because it is composed from logical fields rather than by direct reference to data entities in underlying databases covered by the database abstraction model 148. The database abstraction model 148 defines the logical fields available for query composition. Once composed, the abstract query is submitted to the runtime component 114 which generates a resolved query of the databases 214.

As illustrated in FIG. 1, server system 110 may further include runtime component 114, DBMS server 116, and database abstraction model 148. Each of these components may comprise a software program (and data files) executing on the server system 110. The DBMS server 116 generally comprises a software application configured to manage databases $214_{1-3}$. By way of illustration, the individual databases accessible through DBMS server 116 may include a relational database $214_2$ queried using an SQL query, or an XML database $214_1$ queried using an XML query. The invention, however, is not limited to any particular physical database storage mechanism and may readily be extended to operate on other such mechanisms, whether currently known or unknown. Accordingly, data storage mechanism $214_3$ illustrates other storage mechanisms managed by a DBMS server 116.

In one embodiment, a user composes an abstract query using logical fields defined by a database abstraction model 148. Each logical field may identify a field name and an access method. During the query building process a user relies on the field names to compose a query. Generally, a user composes an abstract query by selecting the logical fields to include as query results and specifying what conditions to apply to the fields. The runtime component 114 uses the access method to map the logical field to data in an underlying database 214. Once composed, the runtime component 114 generates a resolved query using the mapping provided by the access method and the conditions specified in the abstract query. Embodiments of the database abstraction model, logical fields, and access methods are described in greater detail in commonly owned co-pending U.S. patent application Ser. No. 10/083,075, filed Feb. 22, 2002, and entitled "Improved Application Flexibility through Database Schema and Query Abstraction," which is incorporated herein by reference in its entirety.

Runtime component 114 is configured to generate a query consistent with the physical representation of the data contained in one or more of the databases 214. In other words, the runtime component is the "transformational engine" used to generate a resolved query (e.g., an SQL statement) from an abstract query. In one embodiment, the runtime component 114 receives an abstract query, generates an intermediate representation of the query, such as an abstract query plan, and then uses the intermediate representation to generate a resolved query. The resolved query is then issued against the underlying databases $214_{1-3}$. Abstract query processing and abstract query plans are discussed in greater detail in commonly assigned, U.S. patent application entitled "Abstract Query Plan", Ser. No. 11/005,418, filed Dec. 6, 2004, which is incorporated herein by reference in its entirety.

Database Abstraction Model: Logical View of the Environment

Figure 2A:
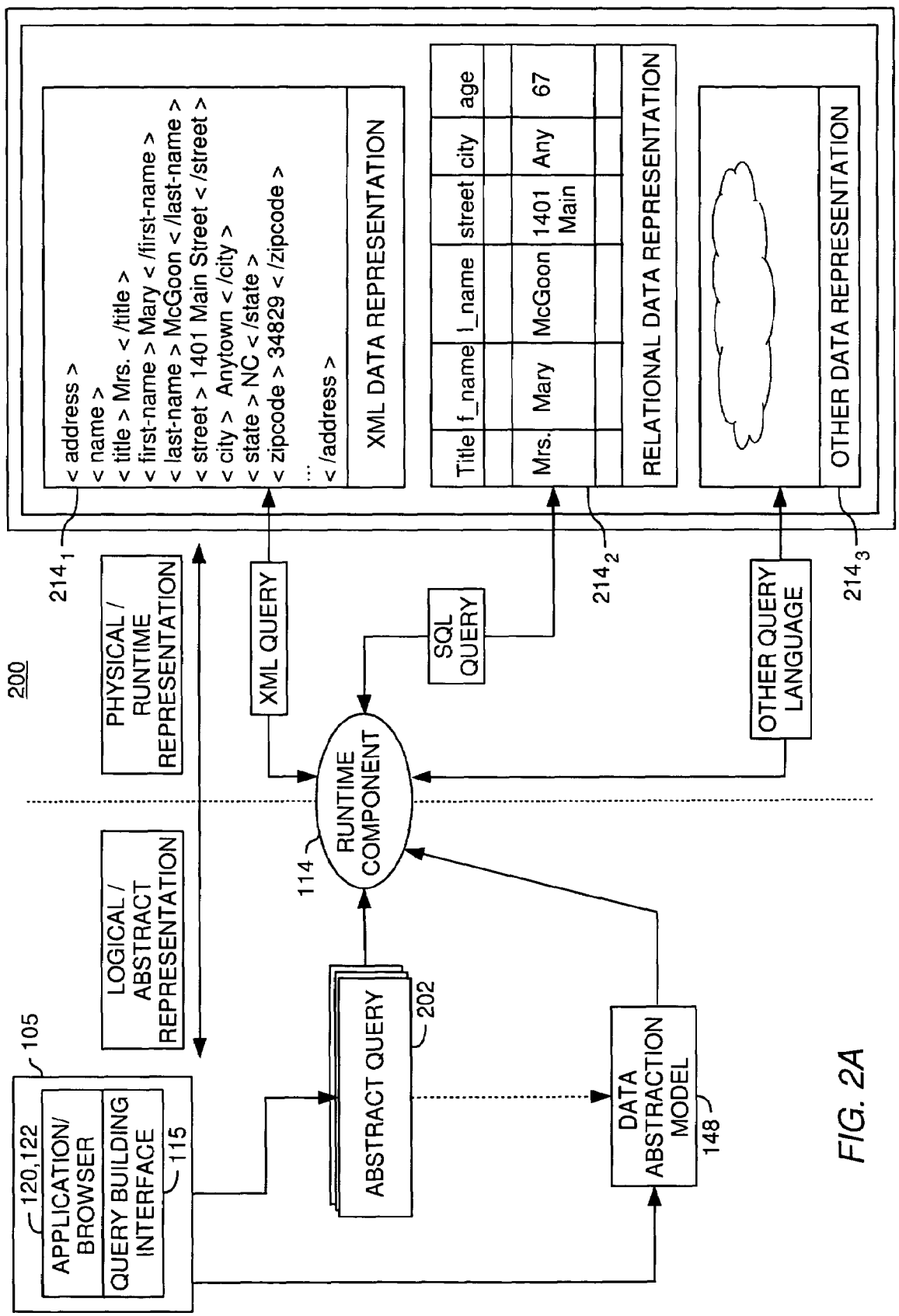
FIG. 2A illustrates a relational view of software components, according to one embodiment of the invention.

FIG. 2A illustrates a plurality of interrelated components of the invention, along with the transformation between an abstract view of data provided by the database abstraction model 148 (the left side of FIG. 2A), and the database systems 214 used to store data (the right side of FIG. 2A). In one embodiment, a requesting entity (e.g., a user interacting with interface 115) composes an abstract query 202 using query building interface 115. The query building interface 115 may be provided by the application 120, or may be rendered as a web-page on web browser 122.

Figure 2B:
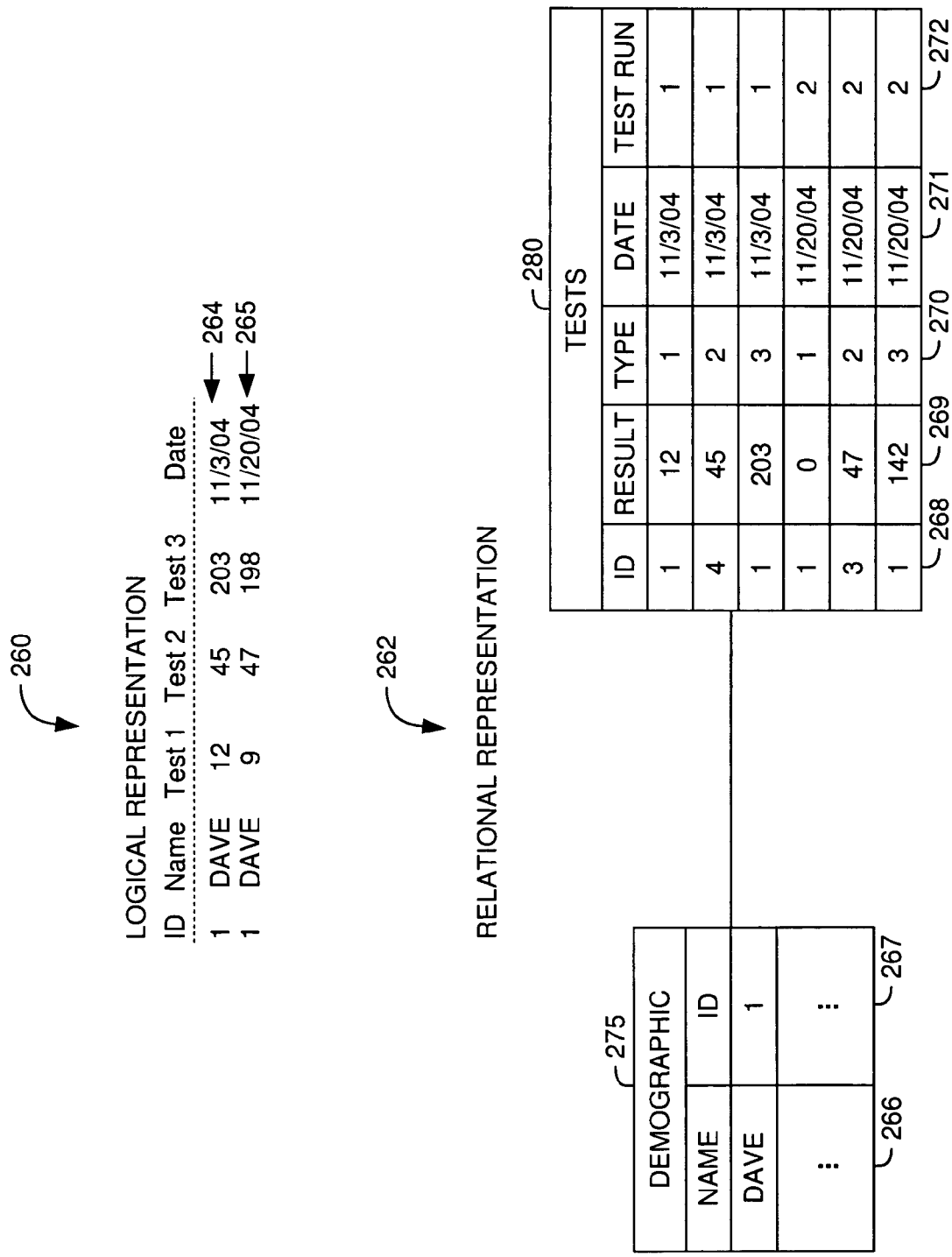
FIG. 2B illustrates both a substantive view of logically related data, as well as a relational representation of the same data used to store the data in a relational database system, according to one embodiment of the invention.
Figure 2C:
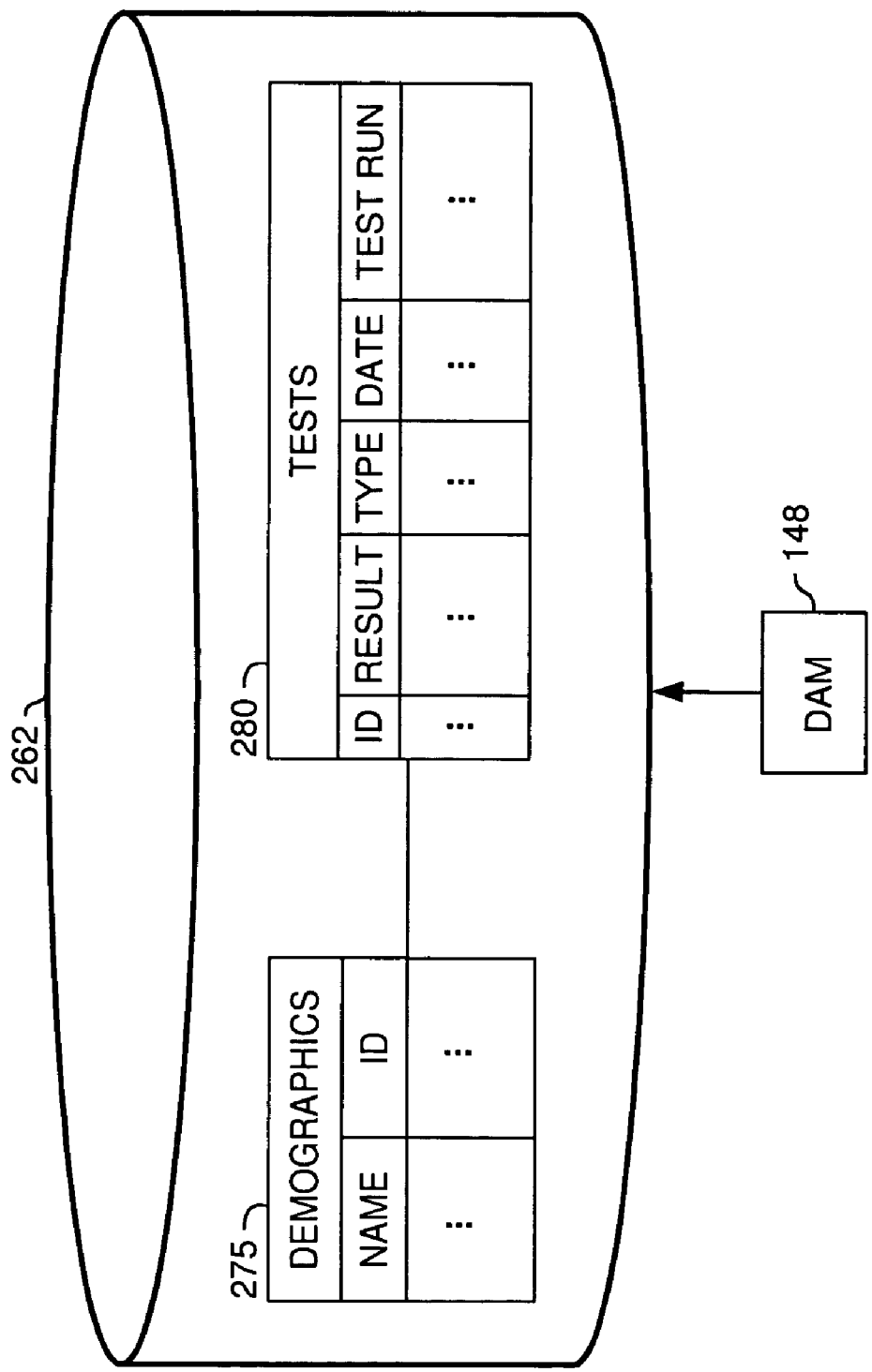
FIG. 2C-E illustrate a database abstraction model constructed over a physical database, according to one embodiment of the invention, including the original database (FIG. 2C), and a data base abstraction model that specifies a set of logical fields (FIG. 2D), and a set of field-to-field join constraints (FIG. 2E).

FIGS. 2B and 2C illustrate a relational database 262 storing database tables 275 and 280. The relational representation 262 illustrates two relational tables 275 and 280 used to store test results. Demographic table 275 includes a name column 266 and an ID column 267. Tests table 280 includes an ID column 268 (used to join the two tables), a result column 269, a type column 270, a date column 271 and a test run column 272. The type column 270 indicates which test type was performed to obtain a test result in the same row of table 280. As test results are added to the table, they remain essentially unordered regarding each set or each patient. Thus, test results for patients "3" and "4" appear interleaved with patient "1". A query for a specific patient's test results will retrieve all the rows for that patient. For example, a query on "patient ID='1'" retrieves the following query results:

TABLE III

| Database Test Table | | | | |
| --- | --- | --- | --- | --- |
| ID | Result | Test Type | Date | Test Run |
| 1 | 12 | Test1 | 11/3/04 | 1 |
| 1 | 203 | Test3 | 11/5/04 | 1 |
| 1 | 12 | Test1 | 11/20/04 | 2 |
| 1 | 142 | Test3 | 11/21/04 | 2 |

The above table, however, fails to provide the desired output and fails to capture what a physician might desire to see;

namely, test results for each test run grouped together. In contrast, logical representation 260 shows a reorganization of these query results, representing what a physician might desire to see. Each test instance (264 and 265) includes a test results for each of Test 1, Test 2, and Test 3 that are part of each instance of the test run.

Figure 2D:
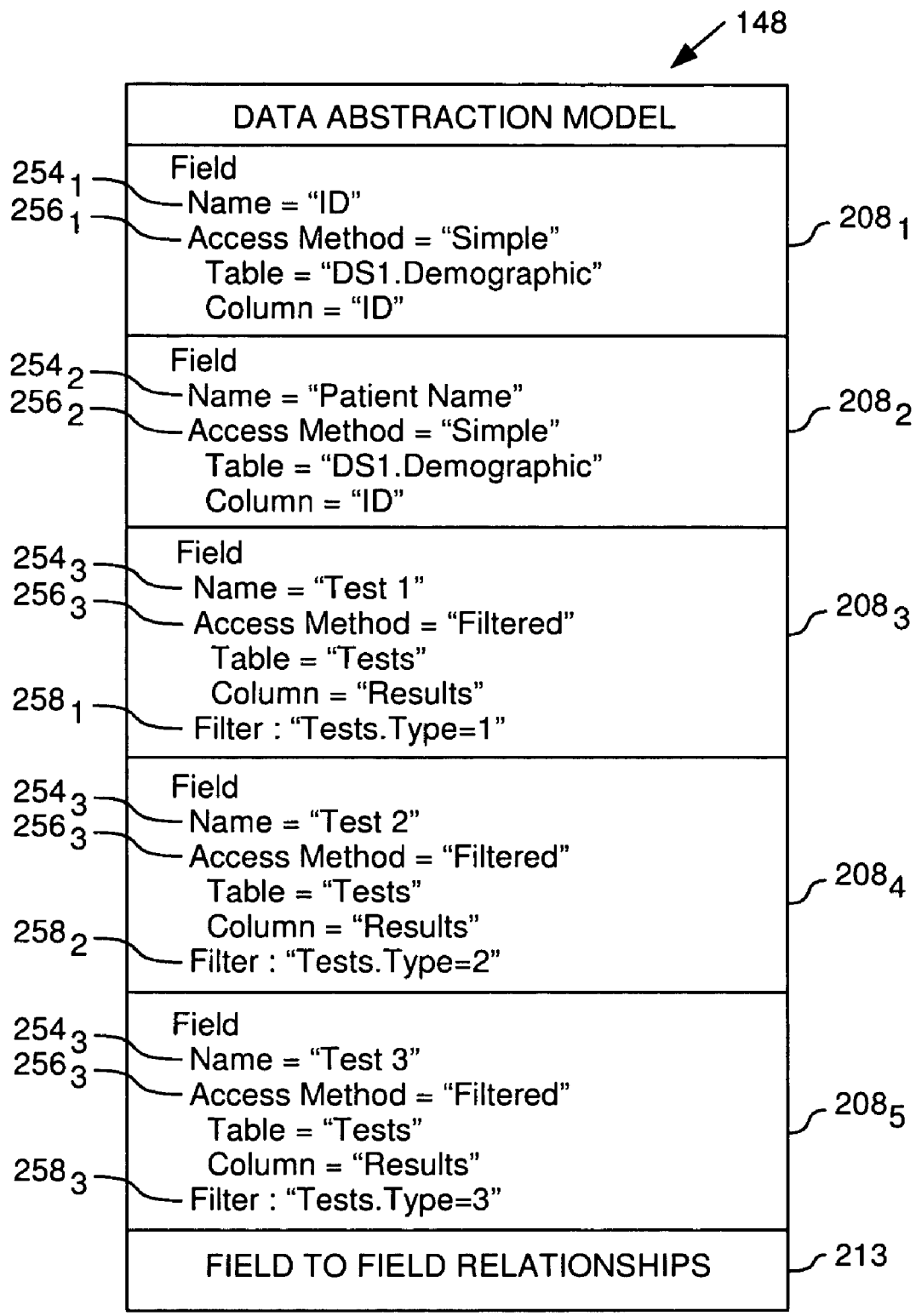
Figure 2E:
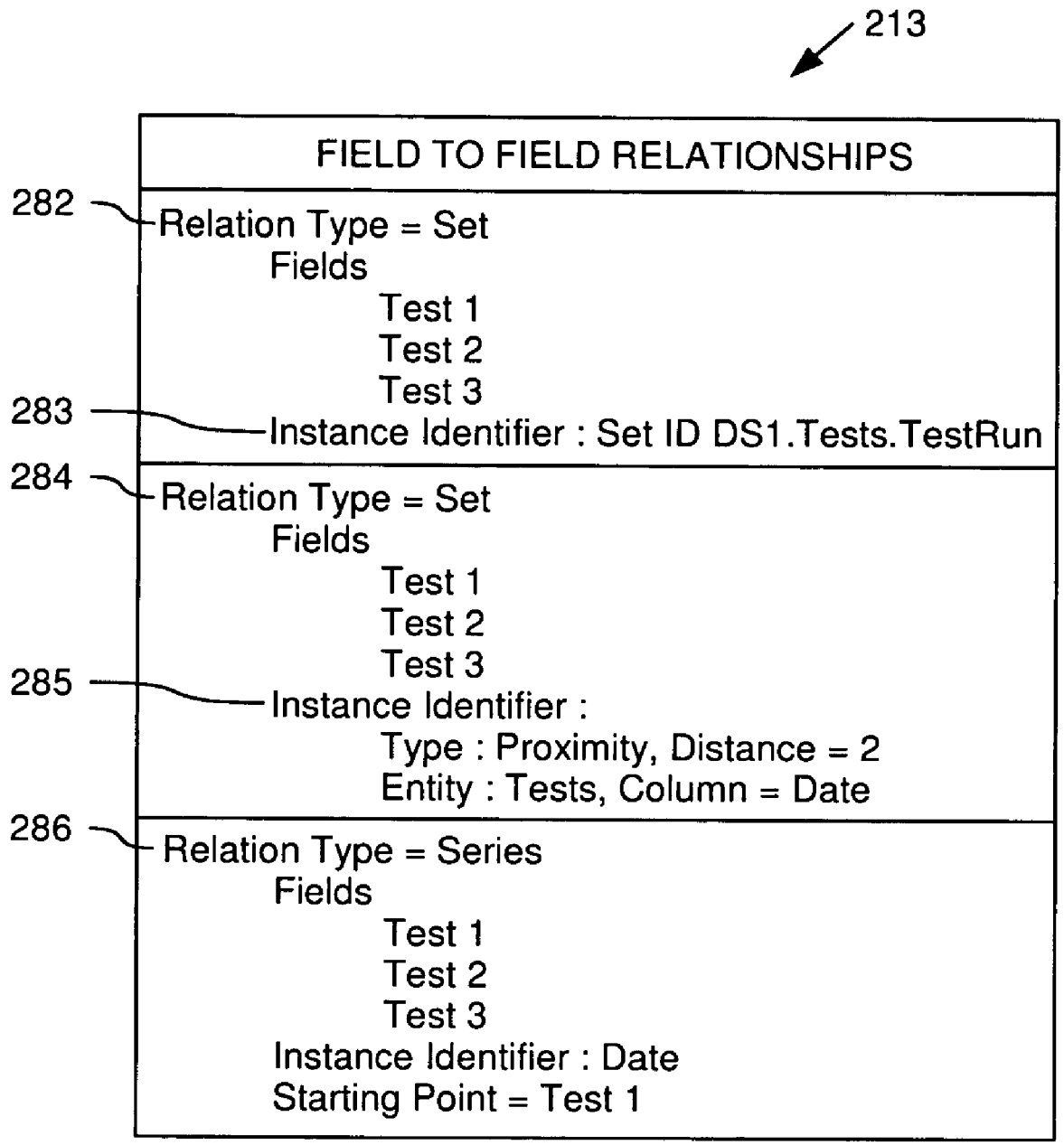

FIGS. 2D and 2E illustrate a database abstraction model 148 constructed over relational database 262. In one embodiment, the logical representation 260 is made possible by providing a database abstraction model constructed over relational database 262, such as the database abstraction model 148 illustrated in FIGS. 2D and 2E and described in detail below. The database abstraction model 148 defines a logical view of the underlying physical database. In one embodiment, the database abstraction model 148 includes field-to-field join constraints to produce the logical representation 260. In a particular embodiment, the field-to-field join constraints are defined for a "set" of related logical fields. In another embodiment the field-to-field join constraints are defined for logical fields that are related as part of a "series" of common events. Each embodiment is described in more detail below.

As illustrated in FIGS. 2D and 2E, the database abstraction model 148 includes plurality of logical field specifications 208 (five shown by way of example). Collectively, logical field specifications 208 create an abstraction over database 262. Each logical field 208 creates part of the abstraction. That is, each logical field 208 relates a logical item of data to data stored in database 262.

Each logical field specification 208 (also referred to as "logical field" for short) includes a name 254 and a reference to an access method 256 that maps the logical field to data in database 262. For example, logical field $208_2$ provides the name $254_2$ "name;" referring to the name of a patient. Logical field $208_2$ includes access method $254_2$ that maps the logical field to data stored in database 262 using a simple access method. A simple access method identifies a table and column storing the data that corresponds to the logical field. Similarly, logical field $208_1$ maps the ID logical field to the ID column of demographic table 275 using a simple access method.

Logical field specifications $208_{3-5}$ each provide a filtered access method. For example, logical field $208_3$, named Test 1, maps the field to test results from the tests table 280. Filtering expression $258_1$ restricts the results returned for logical field $208_3$ to only the tests specified as "test type=1." Logical fields $208_4$ and $208_5$ include a similar filtered access method mapping fields $208_4$ and $208_5$ to test results for Test 2 and Test 3, respectively. Filtered field acts as selection criteria used to restrict items from a larger set of data, without the user having to know the specifics of how the data is represented in the underlying physical storage mechanisms or to specify the selection criteria as part of the query building process.

As noted above, in one embodiment, data from logical fields may be related by being part of a set. Consider, for example, the Test 1, Test 2 and Test 3 test suite illustrated in logical representation 260. Two instances of the set (264 and 265) are illustrated in Table IV:

TABLE IV

| Set Type Test Instances | |
| --- | --- |
| Instance #1 | Instance #2 |
| Test 1 = 12 | Test 1 = 9 |
| Test 2 = 45 | Test 2 = 47 |
| Test 3 = 45 | Test 3 = 198 |

In this example, each of the three tests is given to a patient as part of a set, and embodiments of the invention provide for abstract query processing that return query results presenting the three tests as a set; rather than as individual tests, leaving it to the user to sort out which test results should be grouped together. To this end, the database abstraction model 148 includes a logical field for each test type (Test 1, Test 2, and Test 3) and logical fields for patient demographic data. While processing an abstract query, the runtime component 114 may use data stored in a database (e.g., test run column 272) to associate logically related information into different instances of the set.

This technique is preferred when there is an indication in the underlying database that identifies each set instance (e.g., a test suite number, a patient visit number, or a control number, etc.). More generally, data from the underlying database that directly identifies the instance that an element of data belongs may be used as the instance identifier in a "set" type field-to-field join constraint. In one embodiment, this occurs by adding additional metadata to the database abstraction model 148 specifying the data from the underlying database. For example, field-to-field relationships 213 includes a "set" type relationship associating the test results for the three tests stored in table 280 based on data from the test run column. Alternatively, if no such data is available then some other item of data may be used as a proxy value to determine set membership. For example, if all three all three tests that make up the set-type relationship described above are conducted at the same time, then query results may be grouped into set instances by referencing the time each test was administered.

As noted above, in another embodiment, data retrieved for group of logical fields may be related by being part of a series or part of the same logical process. Consider, for example, a series of tests given to patients over long periods of time as part of a treatment regimen or research study. Oftentimes, these kinds of activity require events to occur in a certain order. Although described herein using chronological relationships, a series-type field to field join constraint may also be defined for other forms of ordered data (e.g., magnitude, volume, color, and the like). Oftentimes, several patients may participate in the same study or treatment regimen more than once. Field-to-field join constraints specified in the database abstraction model 148 may determine which trial each test in the series belongs. Defining field-to-field constraints this way may be used when the underlying database does not keep a sequence number, trial number, or other indication of position within a series.

In one aspect, the series-type field-to-field join constraint may be used to order individual data elements into a sequence, where the sequence could not be known in advance, and, therefore, could not have an existing sequence number. For example, researchers engaging in data mining often attempt to confirm the statistical significance of a series of events leading to an outcome. In one embodiment, the interface 115 may allow a user to impose a field-to-field join constraint on a group of logical fields. The user would specify the logical fields included in the series, along with an instance identifier used order query results corresponding to the logical fields into a sequence. The researcher would set up the events as a series-type field-to-field join constraint, placing the outcome as the last event of the series. This produces a result series which shows the "steps along the way." Similarly, a user may specify a group of logical fields and an instance identifier to group query results corresponding to the logical fields into discrete sets.

To support field-to-field join constraints, in one embodiment, database abstraction model 148 includes field-to-field relationships section 213 that may be used to define both set-type and series-type field-to-field join constrains. The field-to-field constraints are used to group data together during query processing. As described above, field-to-field constraints may include groups of logical fields that form a set, and groups of logical fields that form a series. A set-type field-to-field constraint specifies all of the logical fields included in that field-to-field relationship. For example, field-to-field constraint 282 is defined as a set. This constraint identifies that data from logical fields Test 1, Test 2, and Test 3 belong to this set. Constraint 282 may also include an instance identifier 283. The instance identifier 283 indicates how to group data together to form each separate instance of the set of logical fields. As illustrated, instance identifier 283 references the test run column 272 of test table 280.

Field-to-field constraint 284 illustrates another example of a set-type field-to-field relationship. In this case, the instance identifier 285 refers to other data stored in database 262 to identify instances of the set. Using the suite of medical tests stored in database 262, and instance identifier 285, the instance to which a particular result belongs may be determined by using the dates on which the tests were administered. Specifically, the instance identifier specified for field-to-field relationship 284 identifies the date column of tests table 280. In one embodiment, the runtime component 114 may use functions to perform date calculations (or other calculations) provided by DBMS server 116. Thus, when the database does not include a direct indicator to group query results into set instances, other data from the database may be used.

Field-to-field relationship 286 illustrates an example of a series-type field-to-field relationship. Like the "set" type relationship, "series" relationship 286 also specifies which logical fields are included in the field-to-field join constraint. The instance identifier 287, however, does not specify how to distinguish different instances based on membership in a particular set. Instead, the instance identifier 287 specifies how to construct a logical series, or ordering, of the data retrieved for the logical fields included in the "series" field-to-field join constraints. The Instance identifier 287 specifies that Test 1 always forms the first test of the series, followed by Test 2 and Test 3, respectively.

Database Abstraction Model: Query Processing of Field-to-Field Join Constraints

Thus far, the structural and logical components of the database abstraction model 148 have been described, including, a plurality of logical fields 208, field-to-field relationships 213, the abstract query building interface 115, and runtime component 114. This description now turns to the operational methods used to construct a database abstraction model 148 over databases 214, and to the operations of runtime component 114 used to return query results to a requesting entity. In one embodiment, the runtime component 114 may organize query results according to field-to-field relationships 213 as part of query processing.

Figure 3:
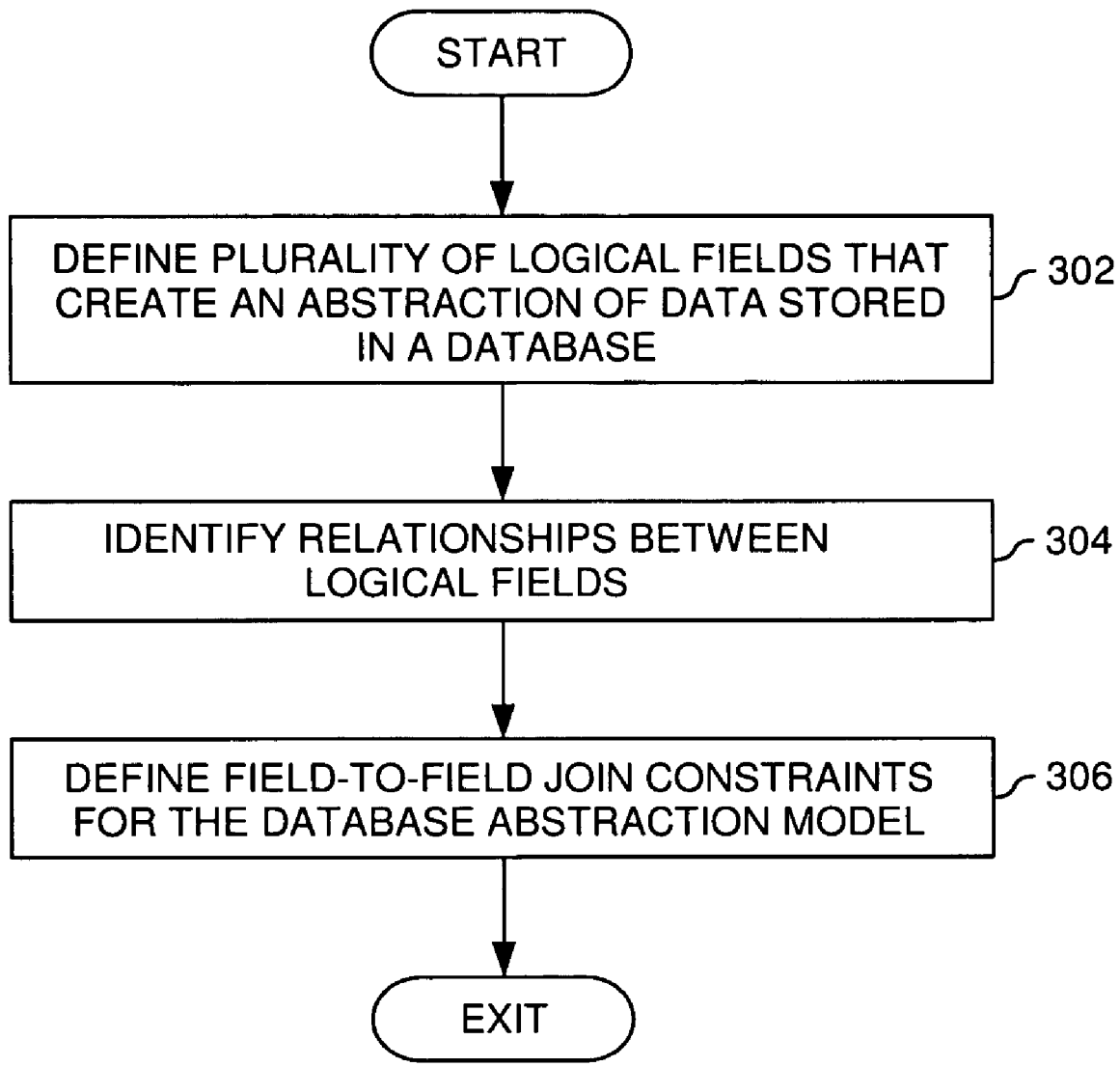
FIG. 3 illustrates a method for creating a database abstraction model over a physical database that includes field-to-field join constraints, according to one embodiment of the invention.

FIG. 3 illustrates a method 300 for creating a database abstraction model over a physical database that includes field-to-field join constraints, according to one embodiment of the invention. Operations 300 begin at step 302 wherein the set of logical fields specified by database abstraction model 148 are defined. As part of this step, logical fields are defined that describe data in a physical database, along with an access method used to map each logical field to data stored in the underlying physical database.

After defining a plurality of logical fields, field-to-field relationships between logical fields may be identified at step 304. Logical fields may be grouped into sets or series using any criteria that might be meaningful to users of the abstract database. For example, test results for a group of tests performed as part of a test suite, a treatment protocol administered in a defined sequence, and a series of events that may be related to an outcome are all candidates for a field to field join constraint. Once a set of useful relationships is identified, field-to-field join constraints are defined at step 306. In one embodiment, each field-to-field join constraint is specified by the logical fields that are part of the constraint, and an instance identifier used to discriminate among different instances of a set-type field to field join constraint or to order elements of a "series" type constraint. At step 303, the database abstraction model 148 is extended to include the field-to-field join relationships section 213.

Figure 4:
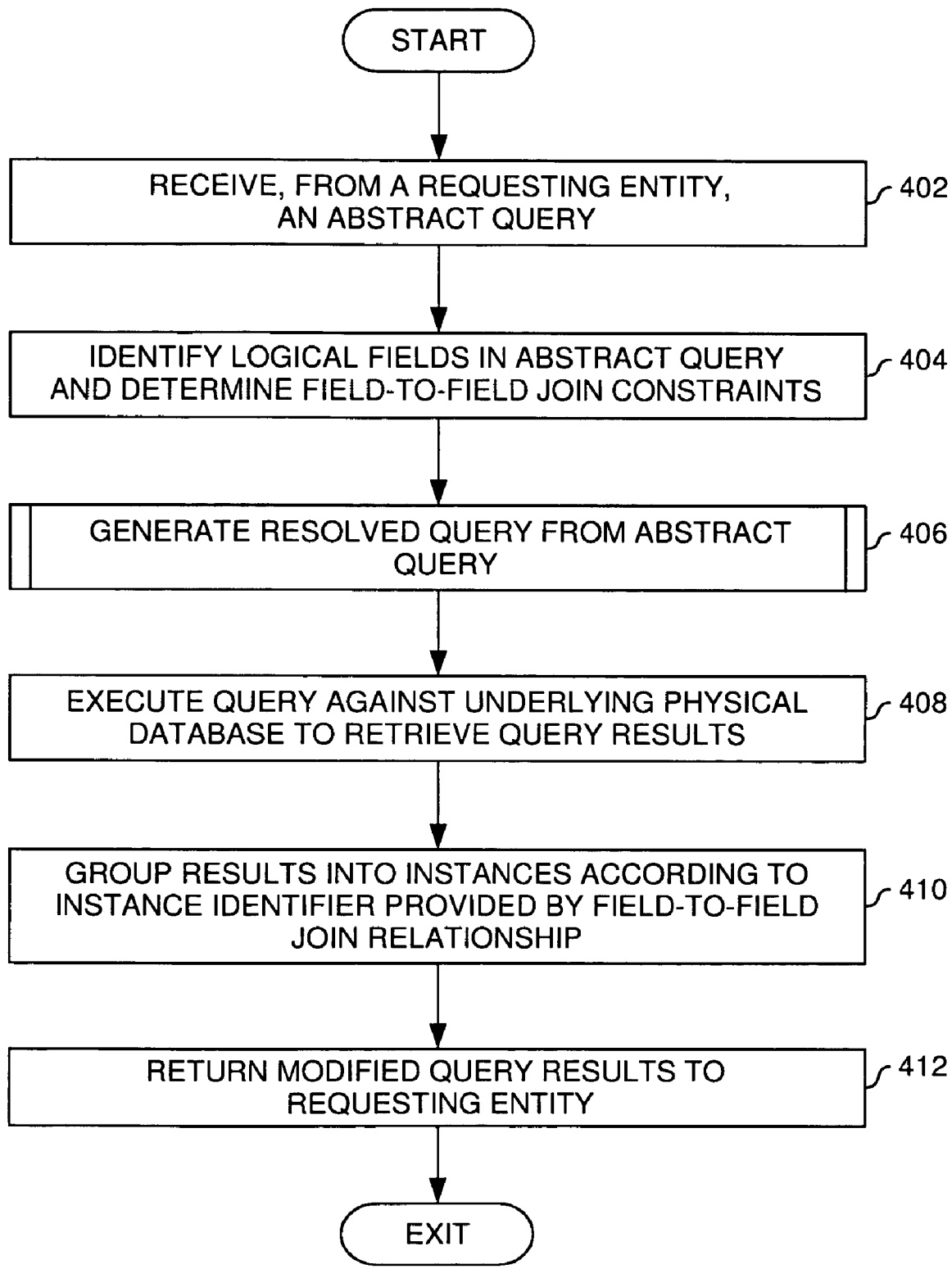
FIG. 4 illustrates a method for processing an abstract query that includes logical fields with corresponding field-to-field join constraints, according to one embodiment of the invention.

FIG. 4 illustrates a method 400 for processing an abstract query that includes a group of logical fields with specified by a field-to-field join constraint, according to one embodiment of the invention. Operations 400 begin at step 402 where the runtime component 114 receives, from a requesting entity, an abstract query composed from the logical fields defined for the database abstraction model 148. In one embodiment, this may occur when a user interacting with query building interface 115 submits an abstract query for execution.

After receiving the abstract query, the runtime component 114 may be configured to identify the logical fields included in the abstract query and determine whether the abstract query includes a set of logical fields specified by a field-to-field relationship. If so, the results for the query are constrained according to the field-to-field relationships. For example, using the logical fields illustrated in FIG. 2C, a user might compose the following query: "Find ID, Name, Test 1, Test2, and Test3." This query includes the logical fields Test 1, Test 2, and Test 3 specified by field-to-field relationship 282. Accordingly, results from this query may be grouped into instances of the set consistent with the instance identifier 283.

Returning again to FIG. 4, at step 406, the runtime component may be configured to generate a resolved query from the abstract query. Step 406 is described below in conjunction with FIG. 5. A resolved query is one consistent with the underlying physical databases abstracted by the database abstraction model and capable of being executed by an appropriate query engine. In one embodiment, this may comprise an SQL query statement of a relational database. At step 408, the query is executed against the underlying database to retrieve a set of query results. Where the resolved query comprises an SQL statement, a relational DBMS server 116 may execute the query against a relational database (e.g. database 262).

Next, at step 410 the query results may be grouped into instances according to the instance identifier specified by the field-to-field join relationship. For example, query results retrieved for the abstract query "Find ID, Name, Test 1, Test2, and Test3," are grouped in the appropriate instances. Each instance includes a value for Test1, Test2, and Test3. At step 412, query results are returned to the requesting entity.

Figure 5:
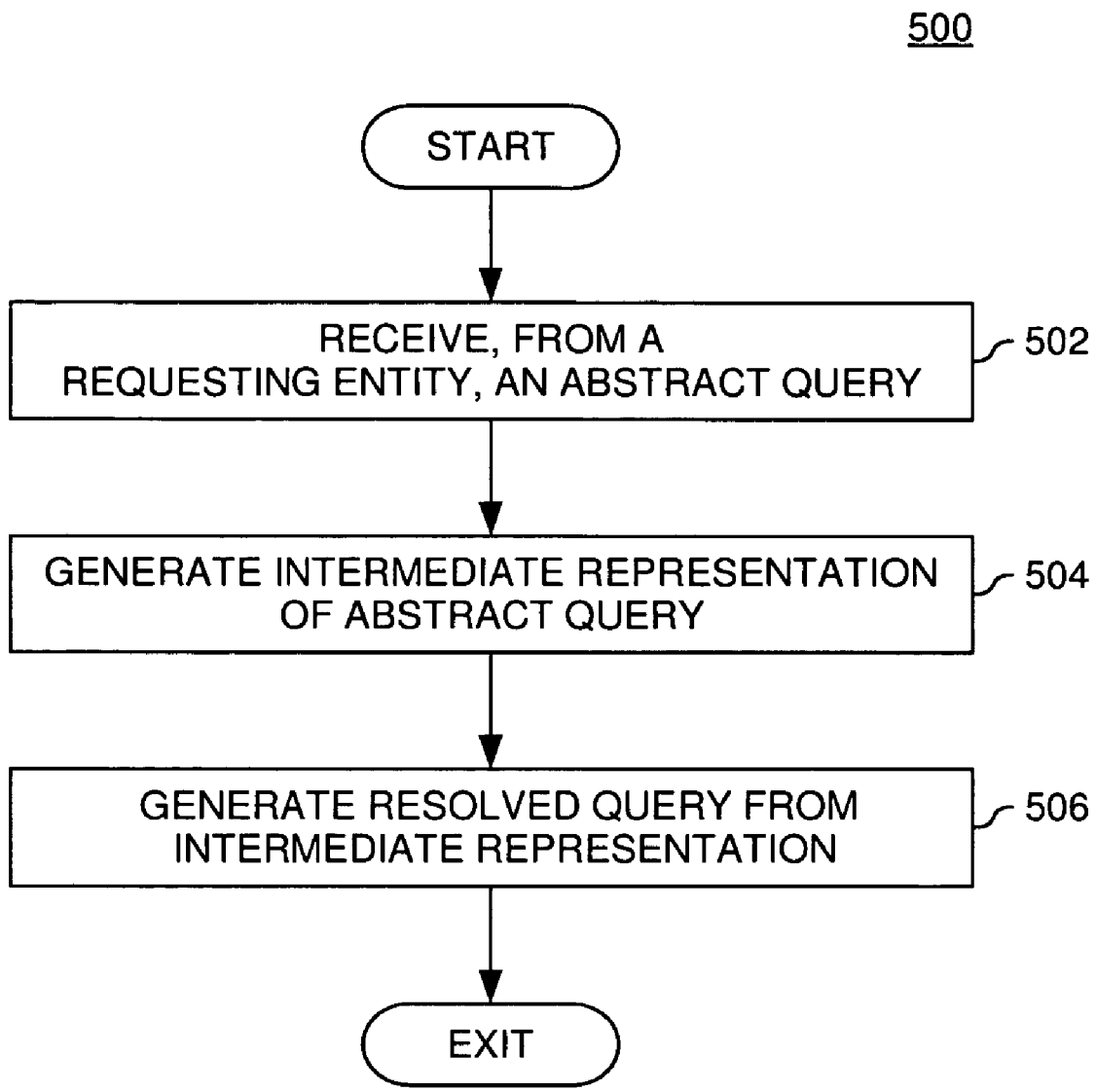
FIG. 5 further illustrates abstract query processing, according to one embodiment of the invention.

FIG. 5 illustrates a flow diagram 500 of the operations of runtime component 114 processing an abstract query as part of step 406 of FIG. 4. Operations 500 begin at step 502 wherein the runtime component 114 receives, from a requesting entity, an abstract query. In one embodiment, the abstract query is composed using query building interface 115, or may also be a saved query composed earlier, by the same or different users. Further, the same database abstraction model may be constructed over different underlying database representations, providing users of physically different databases with a common interface. The abstraction provided by the logical fields and access methods hides the differences in the underlying systems.

Next, at step 504, the runtime component 114 generates an intermediate representation of the abstract query. In one embodiment, the intermediate representation of the query includes a combination of abstract elements from the database abstraction model 148 and elements relating to the underlying physical data storage mechanism. For a database abstraction model constructed over a relational database, the intermediate representation contains all the information about which relational tables store data related to the abstract query, and how to join sets of data retrieved from these tables (i.e., the relationships between the tables or between the logical fields, conditions on data retrieved etc.). Next, the runtime component 114 uses the abstract query plan to generate a query consistent with the storage format of the underlying database. For example, where the underlying storage mechanism is a relational database, the runtime component 114 generates an SQL statement provided to the relational DBMS for execution. Detailed examples of abstract query processing and the intermediate query representation are further described in a commonly assigned, U.S. patent application entitled "Abstract Query Plan", Ser. No. 11/005418, filed Dec. 6, 2004, filed herewith and incorporated by reference in its entirety.

As described above, embodiments of the invention extend the capabilities of an abstract database by providing field-to-field join constraints. In one embodiment, the database abstraction model includes metadata used to identify different groups of related fields. A group of logical fields may be related because they are part of a logical set. For such a set, a field-to-field join constraint may specify a group of logical fields that form the set, and an instance indicator used to determine the particular instance that an element of data is placed into. Second, logical fields may be related because they are part of a series. A series is used to order a data that occurs in a sequence, such test results for a test regimen that are always performed in the same order.

As part of query processing, the abstract database identifies when an abstract query contains logical fields that form either a set-type or a series-type field-to-field join constraint. And when identified, data returned to a user may be organized according to the constraint. For example, the test results from the example query: Retrieve "Name," Test 1, Test2, and Test3 for Patient ID "1", may group the tests results for the three tests according to each instance:

TABLE V

| Field-to-field Query Results | | | | | | |
|---|---|---|---|---|---|---|
| ID Name | Test 1 | Test 2 | Test 3 | Test 1 Date | Test 2 Date | Test 3 Date |
| 1 Hill, David | 9 | 45 | 203 | 11/1/2003 | 11/1/2003 | 11/2/2003 |
| 1 Hill, David | 12 | 47 | 198 | 11/10/2003 | 11/10/2003 | 11/12/2003 |
| 1 Hill, David | 10 | 46 | 233 | 11/20/2003 | 11/21/2003 | 11/19/2003 |

Using "set" type join relationship 284, which indicates that Test 1, Test 2, and Test 3 may be joined based on the same test date, query results are joined according to the relationships between the logical fields included in the "set." Alternatively, users may impose a field-to-filed join constraint on a group of logical fields as part of constructing an abstract query. Presenting query results using field-to-field relationships provide a more accurate representation of query results to a requesting entity.

While the foregoing is directed to embodiments of the present invention, other and further embodiments of the invention may be devised without departing from the basic scope thereof, and the scope thereof is determined by the claims that follow.

What is claimed is:

1. A computer-implemented method of creating a database abstraction model, comprising, by operation of a least one processor:
    defining a database abstraction model, wherein the database abstraction model defines a plurality of logical fields for composing abstract queries via an interface, wherein each logical field specifies (i) a name for the logical field and (ii) at least an access method that maps the logical field to data in an underlying physical database;
    defining, for the database abstraction model, a field-to-field join constraint based on an identified logical relationship for a group of logical fields, wherein the field-to-field join constraint defines how a set of query results retrieved for the group of logical fields should be joined together for purposes of being output;
    wherein an abstract query composed via the interface and including the group of logical fields is a format suitable to be transformed by a runtime component into a resolved query of the database; and
    storing the database abstraction model and the field-to-field join constraint on a computer readable storage medium.

2. The method of claim 1, wherein the set of query results are grouped into one of (i) instances of a set, wherein the field-to-field join constraint includes an instance indicator used to determine into which instance of a set an element of data included in the query results is placed or (ii) an ordered series, wherein an instance identifier is used to determine the order, relative to the series, of an element of data from the query results.

3. The method of claim 2, wherein the series is time-ordered.

4. The method of claim 1, further comprising, providing (i) the interface for composing an abstract query that includes the group of logical fields and (ii) the runtime component configured to generate, from the abstract query, the resolved query of the database.

5. The method of claim 4, wherein the interface is further configured to allow a user to specify an additional field-to-field join constraint for a group of logical fields.

6. A computer-implemented method of processing an abstract query that includes a group of logical fields specified by a field-to-field join constraint, comprising, by operation of a least one processor:
    receiving, the abstract query from a requesting entity having an interface in which the abstract query was composed, wherein the abstract query is composed from a plurality of logical fields specified in a database abstraction model, and wherein each logical field defines at least an access method that maps the logical field to data in an underlying physical database;

generating, from the abstract query, a resolved query of the underlying physical database;

the generating being performed by a runtime component;

issuing the resolved query to the underlying physical database to retrieve a set of query results;

grouping the query results according to the field-to-field join constraint, wherein the field-to-field join constraint specifies how query results retrieved for the group of logical fields should be joined together for purposes of being output; and returning the grouped query results to the requesting entity.

7. The method of claim 6, wherein the set of query results are grouped into one of (i) instances of a set, wherein the field-to-field join constraint includes an instance indicator used to determine which instance of a set that an element of data included in the query results is placed or (ii) an ordered series, wherein an instance identifier is used to determine the order, relative to the series, of an element of data from the query results.

8. The method of claim 7, wherein the series is time-ordered.

9. The method of claim 6, wherein the interface is further configured to allow a user to specify an additional field-to-field join constraint for a group of logical fields.

10. A computer-implemented method of processing an abstract query that includes a group of logical fields specified by a field-to-field join constraint, comprising, by operation of a least one processor:

receiving, the abstract query from a requesting entity having an interface in which the abstract query was composed, wherein the abstract query is composed from a plurality of logical fields specified in a database abstraction model, and wherein each logical field defines at least an access method that maps the logical field to data in an underlying physical database;

generating, from the abstract query, a resolved query of the underlying physical database;

the generating being performed by a runtime component;

modifying the resolved query according to the field-to-field join constraint, wherein the field-to-field join constraint defines how the set of query results retrieved for the group of logical fields should be joined together for purposes of being output;

executing the resolved query to retrieve a set of grouped query results from the database; and returning the grouped query results to the requesting entity.

11. The method of claim 10, wherein the set of query results are grouped into one of (i) instances of a set, wherein the field-to-field join constraint includes an instance indicator used to determine which instance of a set that an element of data included in the query results is placed or (ii) an ordered series, wherein an instance identifier is used to determine the order, relative to the series, of an element of data from the query results.

12. The method of claim 11, wherein the series is time-ordered.

13. The method of claim 12, wherein the interface is further configured to allow a user to specify an additional field-to-field join constraint for a group of logical fields.

* * * * *